United States Patent [19]

Coffee et al.

[11] Patent Number: 6,115,680
[45] Date of Patent: *Sep. 5, 2000

[54] COMPUTER USE METER AND ANALYZER

[75] Inventors: Steven R. Coffee, East Hampton; David B. Pinsley, Great Neck; Karen A. Poloniewicz, East Setauket; Stephen J. Costello, Hauppauge; Steven N. Stanziani, Plainview, all of N.Y.

[73] Assignee: Media Metrix, Inc., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/973,173

[22] PCT Filed: Jun. 7, 1996

[86] PCT No.: PCT/US96/10091

§ 371 Date: Mar. 2, 1998

§ 102(e) Date: Mar. 2, 1998

[87] PCT Pub. No.: WO96/41495

PCT Pub. Date: Dec. 19, 1996

Related U.S. Application Data

[63] Continuation of application No. 08/474,082, Jun. 7, 1995, Pat. No. 5,675,510.

[51] Int. Cl.[7] .................................................. G06F 17/40
[52] U.S. Cl. ...................................... 702/187; 395/187.01
[58] Field of Search ............................... 702/187–188; 364/709.05; 395/186, 187.01, 684

[56] References Cited

U.S. PATENT DOCUMENTS

| | | |
|---|---|---|
| 4,044,376 | 8/1977 | Porter . |
| 4,058,829 | 11/1977 | Thompson . |
| 4,356,545 | 10/1982 | West . |
| 4,546,382 | 10/1985 | McKenna et al. . |
| 4,566,030 | 1/1986 | Nickerson et al. . |
| 4,658,290 | 4/1987 | McKenna et al. . |
| 4,713,791 | 12/1987 | Saluski . |
| 4,827,508 | 5/1989 | Shear . |
| 4,912,552 | 3/1990 | Allison, III et al. . |

(List continued on next page.)

OTHER PUBLICATIONS

Louis Desjardins, computer advertisement for "Activity Monitor.".

Basic Systems, Inc., computer advertisement for "Win, What, Where.".

Keith Schultz, *A Sentry for More Than Just NetWare*, citation from PC Magazine, Feb. 7, 1994, vol. 14, #3, p. NE47(1).

Eric Smalley, *Modules Debut for App Meter*, citation from PC Week, Dec. 5, 1994, vol. 11, #48, p78(1).

Kristina B. Sullivan, *Software–Metering Tools Can Optimize License Usage*, citation from PC Week, Nov. 14, 1994, vol. 11, #45, p179(1).

Cassimir Medford, *Software Sentry Guards Against Copyright Infringement* citation from VARBusiness, Oct. 1994, vol. 10, #14, p23(2).

Barbara Darrow, *VARs Embrace New App Metering Tools*, citation from Computer Reseller News, Sep. 12, 1994; #595, p101(1).

Ken Philips, *Metering Sentry Offers Low–Priced Efficiency*, citation from PC Weeks, Nov. 28, 1994, vol. 11, #47, pN10(1).

*Primary Examiner*—Kamini Shah
*Assistant Examiner*—Craig Steven Miller
*Attorney, Agent, or Firm*—Fulbright & Jaworski, LLP

[57] ABSTRACT

The subject system measures and reports the use of a personal computer by a user through a log file. The log file includes entries corresponding to predetermined events and can report on the applications used and communication functions engaged in by the user. The log files from one or more computers may be assembled and analyzed in order to ascertain computer use habits for computer software, computer hardware and computer communications. The system may also be used to predict computer use trends and to represent computer use history.

23 Claims, 4 Drawing Sheets

U.S. PATENT DOCUMENTS

| | | |
|---|---|---|
| 4,977,594 | 12/1990 | Shear . |
| 5,008,929 | 4/1991 | Olsen et al. . |
| 5,023,907 | 6/1991 | Johnson et al. . |
| 5,032,979 | 7/1991 | Hecht et al. . |
| 5,050,213 | 9/1991 | Shear . |
| 5,101,402 | 3/1992 | Chiu et al. . |
| 5,231,593 | 7/1993 | Notess . |
| 5,321,838 | 6/1994 | Hensley et al. . |
| 5,406,269 | 4/1995 | Baran . |
| 5,410,598 | 4/1995 | Shear . |
| 5,483,658 | 1/1996 | Grube et al. . |
| 5,696,702 | 12/1997 | Skinner et al. . |
| 5,878,384 | 3/1999 | Johnson et al. .......................... 702/187 |

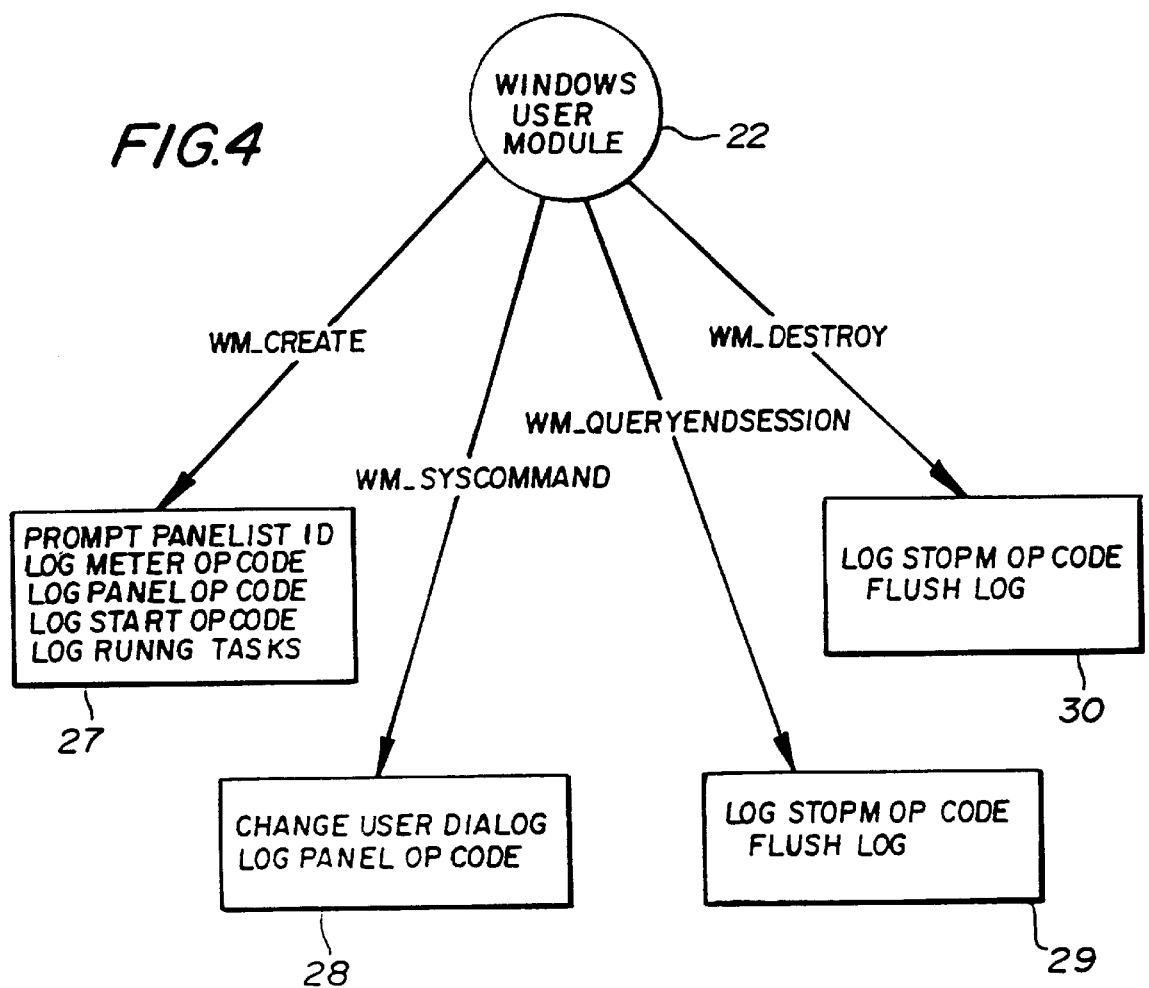
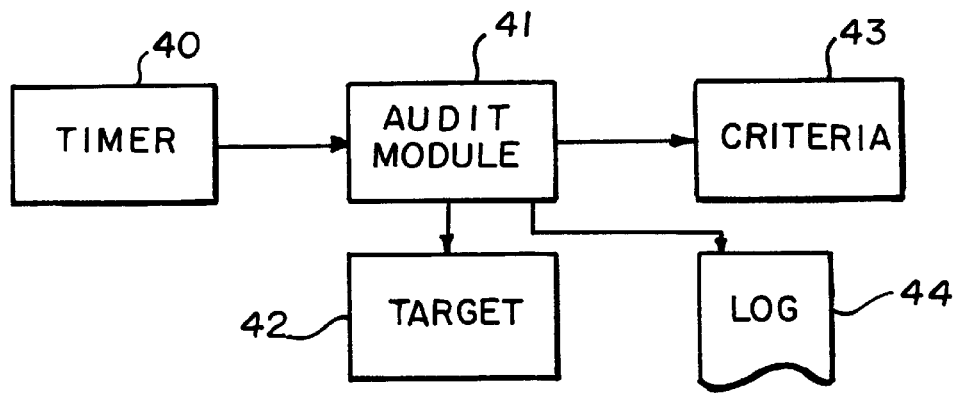

COMPUTER USE METER AND ANALYZER

RELATED APPLICATION

This application is a National Stage of International Application No. PCT/US96/10091, filed Jun. 7, 1996, which is a continuation of U.S. patent application Ser. No. 08/474,082, filed Jun. 7, 1995, now U.S. Pat. No 5,675,510, and are incorporated by reference in their entirety.

BACKGROUND OF THE INVENTION

1. Field of the Invention

The invention relates to a system for monitoring computer use and, more particularly, a system for collecting, logging, and analyzing preselected operations in a personal computer and reporting use trends.

2. Description of the Related Technology

The popularity of personal computers has exploded in the past decade. Each year more and more people have used more and more personal computers in more and more ways. This raped expansion has resulted in an astronomical increase in the amount of money spent on computers, computer related services, computer software, computer peripherals and electronic information and information services. In just the past few years, on-line services such as CompuServe, Prodigy, and America On-Line have gone from virtual obscurity to household words. Our children learn to surf the "net" before they can ride bicycles. Heretofore, there has been no effective reliable mechanism to measure computer usage on a local or broad basis.

Organizations which sell any computer related products or services or which conduct any marketing activity in any electronic format will have an intense need to measure use of computer related resources and dissemination of electronic information. In much the same fashion that television advertisers rely on television ratings and viewer demographics to evaluate television marketing, "electronic" advertisers and sellers and producers of computer related products and services will need to evaluate information on computer use and "on-line ratings."

SUMMARY OF THE INVENTION

It is an object of the invention to facilitate the collection of reliable information regarding the use of personal computer software.

It is a further object of the invention to facilitate the collection of reliable multi-media viewing statistics of commercial on-line services as well as access to the "information superhighway," including the use of the Internet's World Wide Web.

It is a further object of the invention to facilitate the establishment of a panel of personal computer using households in order to develop useful reports for a number of different industries including, without limitation, software manufacturers, commercial on-line service providers, computer hardware manufacturers, and on-line marketers.

According to the invention, a system may be provided to intercept and monitor operating system messages. Such messages may be targeted instructions to various applications or operating system overhead messages. Such messages may be generated internally by the operating system software, such as the Microsoft Windows operating environment. A system according to the invention may filter through a vast array of messages and capture only specific messages, such as those messages which indicate a change in focus from one application to another. These changes in focus may include but are not limited to an application launch, the termination of an application, switching resources from one application to another, minimizing an application, or restoring an application.

According to the invention, operating system messages may be intercepted and relevant messages may be recorded in a log file, along with other pertinent or useful information. Such pertinent or useful information may include date stamps, time stamps, message types such as launch, terminate, switch, minimize, restore, etc., household ID numbers, identification of individual users within a household, identification of an application's executable program file name and file size, an application's Window title, and the handle to the "instance" of the application. A household identification number may be a number which uniquely identifies a personal computer within a "panel" of households, each of which is contributing data to the system through use of a local metering system.

Advantageously, the system according to the invention may be utilized in association with a plurality of computers and computer users. The computers and computer users associated with the system may be intended to be representative of a much larger universe of users. This is analogous to collection of television viewing information used to establish television ratings based on a limited number of households. The limited number of households is considered representative of the overall computer use or "viewing."

According to the invention, a meter application installed in a personal computer may log events for top-level Windows for any given application. Events which are specific to child Windows of an application may not necessarily be logged. For certain applications, additional detailed event logging for such child Windows will occur. If an application is targeted for more detailed logging, the messages indicating the creation of child Windows will be logged. The entries into the log file will advantageously include at least date, time, household ID number, individual within the household using the computer, the handle to the instance of the parent application, the parent application's current Window title, and the child Windows title.

In addition, it is an object of the invention to monitor and log certain external communications. The local meter application will monitor strings of characters sent to a communication port such as a modem. The system may be set to monitor for certain predetermined character strings and log certain information upon occurrence of such strings. If, for example, the system detects a "http:" string, then the system will recognize that what follows should be the remainder of a Universal Resource Locator (URL) for a hypertext protocol site on the Internet's World Wide Web. If the local meter application identifies a URL, it will intercept and log the full URL. In this situation, the log entry may include at least the date, time, household ID number, individual user within the household, the handle to the instance of the parent application, the parent application's current Window title, and the Universal Resource Locator (URL).

According to the invention, the application may also generate specialized logs or log specialized events. These specialized logs/events may focus on preselected applications or a class of applications, such as on-line services or internet browser requests. Advantageously, a timer may be utilized to trigger a periodic audit of the focus of a personal computer. The periodic audit may be conducted, for example, every half-second or at such other intervals as may be appropriate. The interval may be longer to conserve processing resources at the expense of risking missing a shift in focus.

According to one feature of the invention, the periodic audit may poll the operating system for all open windows in order to determine if preselected applications are running. Such preselected applications may include on-line service applications, such as America Online, Prodigy, the Microsoft Network or Compuserve. If such an application is running, the meter application may log the textual content of the title bars of the application and the top window in such application. Advantageously, the system may log the title bar only if the textual contents of the title bars of the application or the top window have changed since the previous audit. In addition, each audit may monitor open windows for edit boxes. Upon discovering an edit box in an open window, the system may examine the syntax of the content of the edit box in order to determine if it is consistent with a URL. If so, the URL may be logged in the event log or a specialized log.

According to the invention, the meter application may have a number of other "housekeeping" features, including a mechanism for installing the meter application on the computer, a data compression and encryption system for the data log, a log transfer mechanism, a self updating software feature, and a user.

The data compression and encryption system may advantageously be provided to minimize the memory resources which must be allocated to storage of the event log and may encrypt the event log in order to enhance the security of the information contained therein.

The data transfer system can be provided to transfer the local personal computer use log to a central processing system. The central processing system may assimilate many local personal computer use logs, translate the log information into useful information, evaluate the information, and create various reports and analyses of computer use. The transfer may be accomplished by any of a number of different mechanisms including automated, user initiated, or central office initiated electronic transfers, or local downloading to a magnetic storage medium such as a diskette, and delivery of the diskette to the central processing location.

The computer use meter and its supporting software may from time to time undergo system updates. These updates are intended to add features to the software and to correct any system bugs. Each panelist will be contacted on a fixed cycle, advantageously once per month, for the purpose of collecting the prior month's logged activity. This process may occur via a diskette mailed to the panelist, or telecommunicated via modem. The data transfer program, delivered on whatever medium, may first check for any outstanding software upgrades. If one is scheduled, then software will automatically be transferred to the panelist's computer.

The system may include a questionnaire which is invoked in certain circumstances, such as after use of a particular class of software, type of application, or periodically the user may be prompted to input desired information which may be stored in the event log or in a separate file. The data transfer system may be used to upload the responses and download additional questions or triggers.

One of the advantages of the system according to the invention is the recordation of changes in processor focus in the event log. Software marketers have a pressing need for information about how users behave with their products. "Use" information is typically gathered, if at all, through paper questionnaires or telephone interviewing. In such situations, the respondent is asked to recall their own uses of the product in question. This technique exhibits significant flaws, including the limitations and inaccuracies inherent in human recollection, the limitations on the amount of time the individual computer user may be willing to spend to provide such information, and that the individual responding to the questionnaire may be only one of the members of the household using the computer system and may not have all of the pertinent information.

The system according to the invention overcomes the aforementioned deficiencies. After an initial installation process, the system may be completely passive. That is, the computer user does not have to take any additional action for the system to operate effectively. The use of any software product or application program may automatically trigger an event message in the operating system environment which may be recorded by the system. Far more information may be gathered in this automated fashion by the computer than by subsequent interaction with a computer user. For example, information relating to the date and time of an event may easily be captured using the computer's internal clock and calendar, where such information would not normally be recalled by a user during a subsequent personal report. The construction of the event log is typically extremely rich in useful information and will enable classification of software usage at least by software title, classification of software subcategory (e.g., spreadsheets, screen savers, communications software, Personal Information Managers, word processors, etc., or by household demographics, e.g., presence of children, income, geography, etc. The system according to the invention will also be able to measure software use by total minutes of use, i.e., cumulative focus minutes, frequency of use, i.e., number of accesses in a given time frame, and share of computer use.

According to an additional advantageous feature, the system will enable detailed logging for certain applications. The commercial on-line service industry is highly competitive, and with Microsoft entering the industry the competition will be increasing. Currently, the three largest providers, CompuServe, Prodigy and America On-Line, each have roughly two million subscribers. The single biggest challenge for these organizations is to reduce subscriber attrition and increase the length of time any individual maintains a subscription. Attrition is in effect a measure of customer satisfaction and inversely related to an on-line service's revenue stream. Reducing attrition means keeping subscribers longer and increasing revenue.

The system according to the invention may advantageously collect child Window information for commercial on-line service providers and user applications. Window titles of these applications' child Windows generally hold useful descriptions of the activity at that moment. For example, if a subscriber is using the mail system for that service, then the Window title will so indicate. The system according to the invention will record those titles in the log file.

To illustrate, the Window title for the window for writing an electronic mail message is "Create Mail" in CompuServe, "Write" in Prodigy, and "Compose Mail" in America On-Line. The collection and analysis of this information is valuable for on-line service providers in many ways which include, but are not limited to, distribution of time spent in various features on competitive services, identification of which features of each are preferred by users of multiple services, and identification of which features of various services are popular and how attention to these features changes relative to the length of subscription membership. The information recorded in the log is valuable for on-line service providers because it can give them direct feedback about customers and point out areas for improvement of the services. The system according to the invention can also measure traffic within an on-line content area of a commercial on-line service, such as electronic magazines and newspapers. As publishers move to on-line media, media traffic statistics become critical. It provides a media planner with important input. In addition, an advantageous feature of the invention provides for interception and logging of communication port or modem traffic. As an extension of tracking activities on commercial on-line services, the system according to the invention may create a full picture of on-line activity if it also measures traffic on other communication channels such as the Internet World Wide Web. Internet sites on the web are addressable by a Universal Resource Locator scheme.

On-line marketers are trying to understand the characteristics of Web traffic and how much time users spend at different sites. These traffic statistics become fundamental inputs for media planning, in a fashion analogous to using TV ratings as a basis for buying or pricing commercial time.

According to an additional advantageous feature, the system includes automated file management functions. These functions are needed to keep the system from interfering with the efficient operation of the host computer. Event log files can grow quite large. Keeping the log as small as possible may be important. Data compression techniques may be utilized to reduce the size of the event log. In addition, the system according to the invention must maintain as passive a profile as possible. Thus, the automated installation and data transfer programs will reduce the interference with the use of the computer by the user and minimize the impact on any particular user.

BRIEF DESCRIPTION OF THE DRAWINGS

FIG. 4 shows responses to messages.

FIG. 5 shows an audit-based subsystem.

DETAILED DESCRIPTION OF THE PREFERRED EMBODIMENTS

Figure 1:
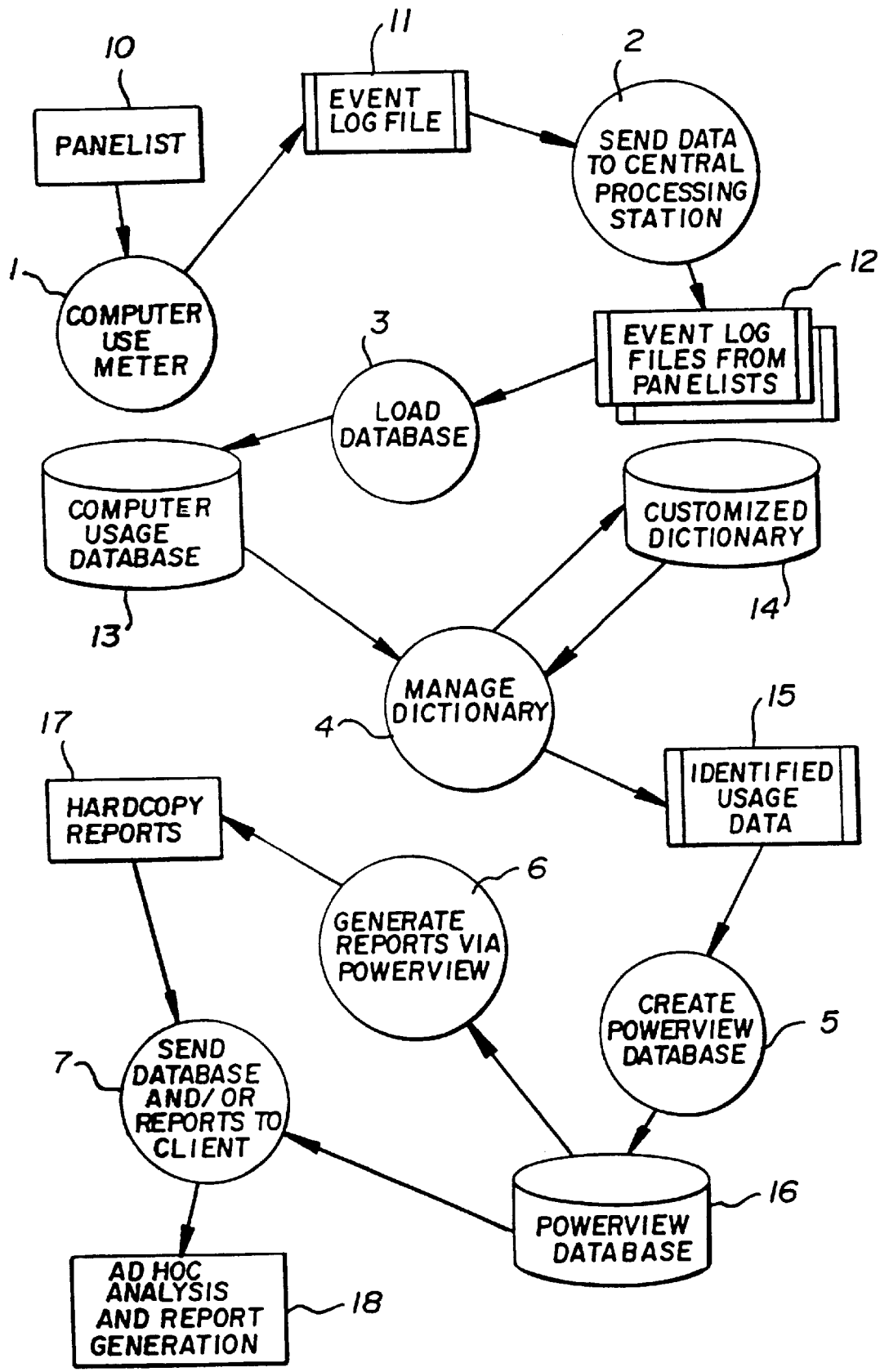
FIG. 1 shows a flow diagram for the invention.

According to an embodiment of the invention, a system is provided to collect, process and deliver information regarding use of personal computer resources. FIG. 1 illustrates a flow diagram of an embodiment according to the invention. A computer use meter 1 may be installed on a personal computer owned and/or operated by a panelist or group of users 10. The panelist advantageously would designate the members of a particular household and may constitute one or more individuals. The computer use meter advantageously generates an event log file 11. A mechanism 2 is provided to transmit the event log files to a central processing station. The transmission may be accomplished by transfer to a portable medium such as a floppy disk or over a communication channel such as a telephone link or by electronic mail. The transmission may be or triggered by any predetermined criteria such as time, number of logged events, size of log file, resources used or available or any combination thereof. The central processing station accumulates log files from a plurality of separate computer use meters 12. The central processing station at location 3 will load a data base 13 with the information from the plurality of event log files. The central processing station may be a micro processor based computer and may utilize a variety of commercially available and/or custom developed data base management systems 4 to manage the computer use data base 13 and create a customized data dictionary 14. The customized data dictionary is provided to interpret the raw data provided by the event log files. In addition, the data base management system 4 may extract useful information, provide preliminary processing and/or analysis of the accumulated event log files. The system will also identify usage data at location 15. Any logged event which is not recognized by the customized dictionary will be noted as an exception and stored for subsequent manual identification. User or manual intervention at this stage may enable further identification and the customized dictionary 14 may be updated so that subsequent occurrences of a similar event will be automatically identified by the customized dictionary 14. All log events identified either through the customized dictionary or through manual intervention 15 will be utilized to create a raw data base of information at location 5. This data base may be organized by different database management systems. It is contemplated that the data base may be in the form of a NPD/POWERVIEW data base 16, commercially available from The NPD Group, Inc.

At location 6, the Powerview data base management system may generate reports or preprocess information in the data base for subsequent analysis 7. The system may generate reports showing information derived from the data base elements maintained. The data may be organized and reported in virtually any desired formula and organization. Given the strengths and weaknesses of various commercially available data base management systems, the data may be processed through one or more data base management systems to generate hard copy reports 17 or to generate a sub-database which may utilized for ad hoc analysis or report generation 18.

Figure 2:
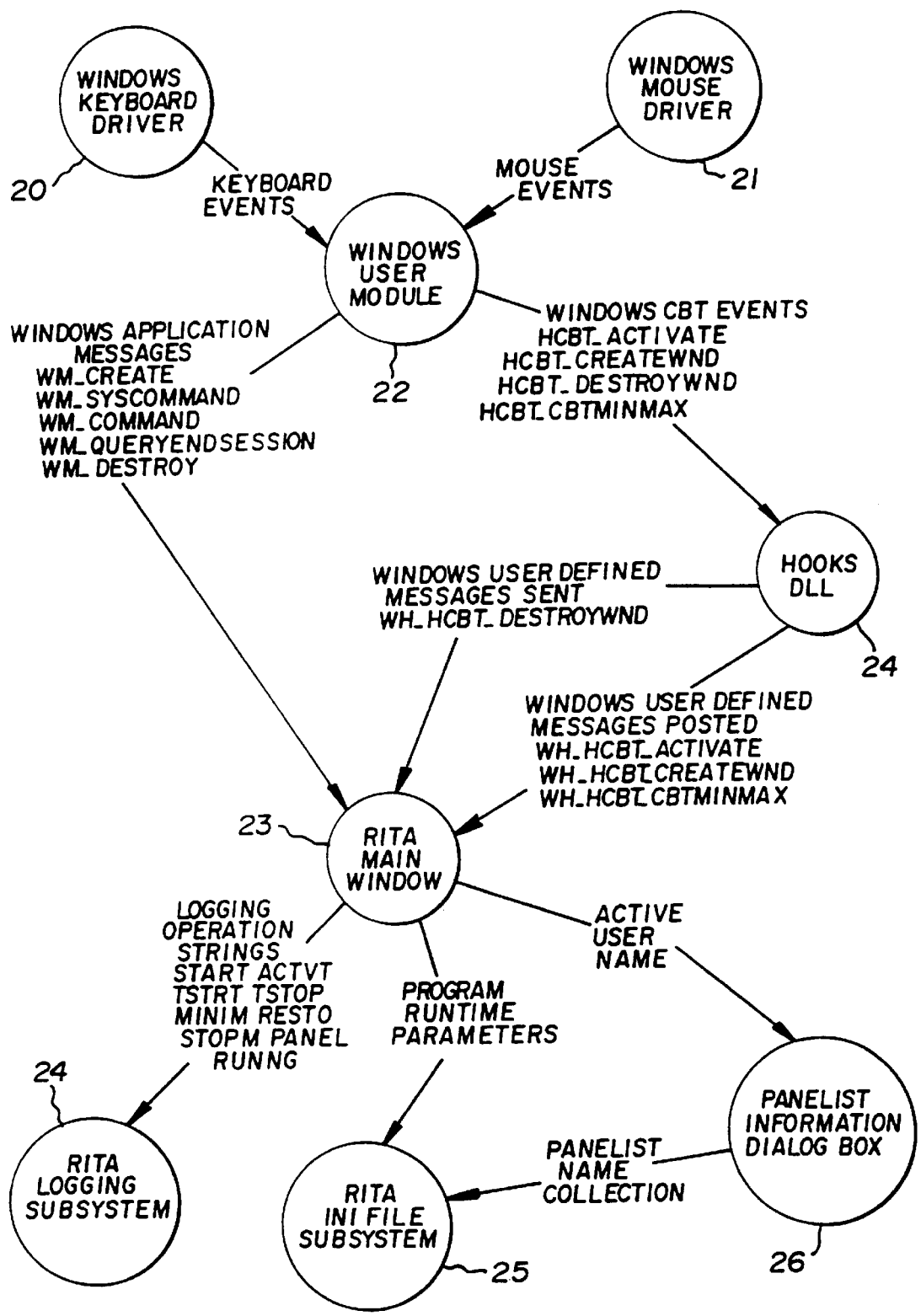
FIG. 2 shows an embodiment of the invention.

FIG. 2 shows a computer use meter according to the invention with a representation of information and data flow installed in an IBM-compatible personal computer operating in the Windows environment. The Windows environment internally generates messages used by various modules to manage the operation of the computer and allocate its resources. Most application program development does not require treatment with the internal overhead handled by the operating system. The Windows environment handles a vast array of overhead functions through the use of internal drivers. The internal drivers may include a Windows keyboard driver 20 and a Windows mouse drive 21. These drivers manage the overhead of manipulating mouse pointers, clicking the mouse buttons and entering information on the keyboard. User interface events such as mouse events and keyboard events are transmitted to a Windows user module 22.

As shown in FIG. 2, the main operating module 23 of the computer use meter is identified as RITA and operates within its own window. The Windows user module 22 generates application-specific messages such as WM_CREATE, WM_SYSCOMMAND, WM_COMMAND, WM_QUERYENDSESSION, and WM_DESTROY. These messages are intended only for specific main window application modules. RITA module 23 monitors these messages for commands invoking the RITA application main window 23. After being invoked, the HOOKS DLL module 24 operates to provide messages to the RITA main window module 23. During operation of the personal computer, the Windows user module 22 generates Windows call-back or "CBT" events. Certain specific events are intercepted by the HOOKS DLL module and transmitted to the RITA main module 23. Upon receipt of such messages, the RITA main window sends certain messages to the RITA logging subsystem 24. In addition, the RITA main window 23 transmits program run time parameters to the RITA INI file subsystem 25. The RITA INI file subsystem will communicate with a panelist information dialogue box 26 for the purposes of panelist name collection. The panelist information dialogue box 26 will also transmit an active user name to the RITA main window 23. The active user name is utilized in connection with the logging operation.

Figure 3:
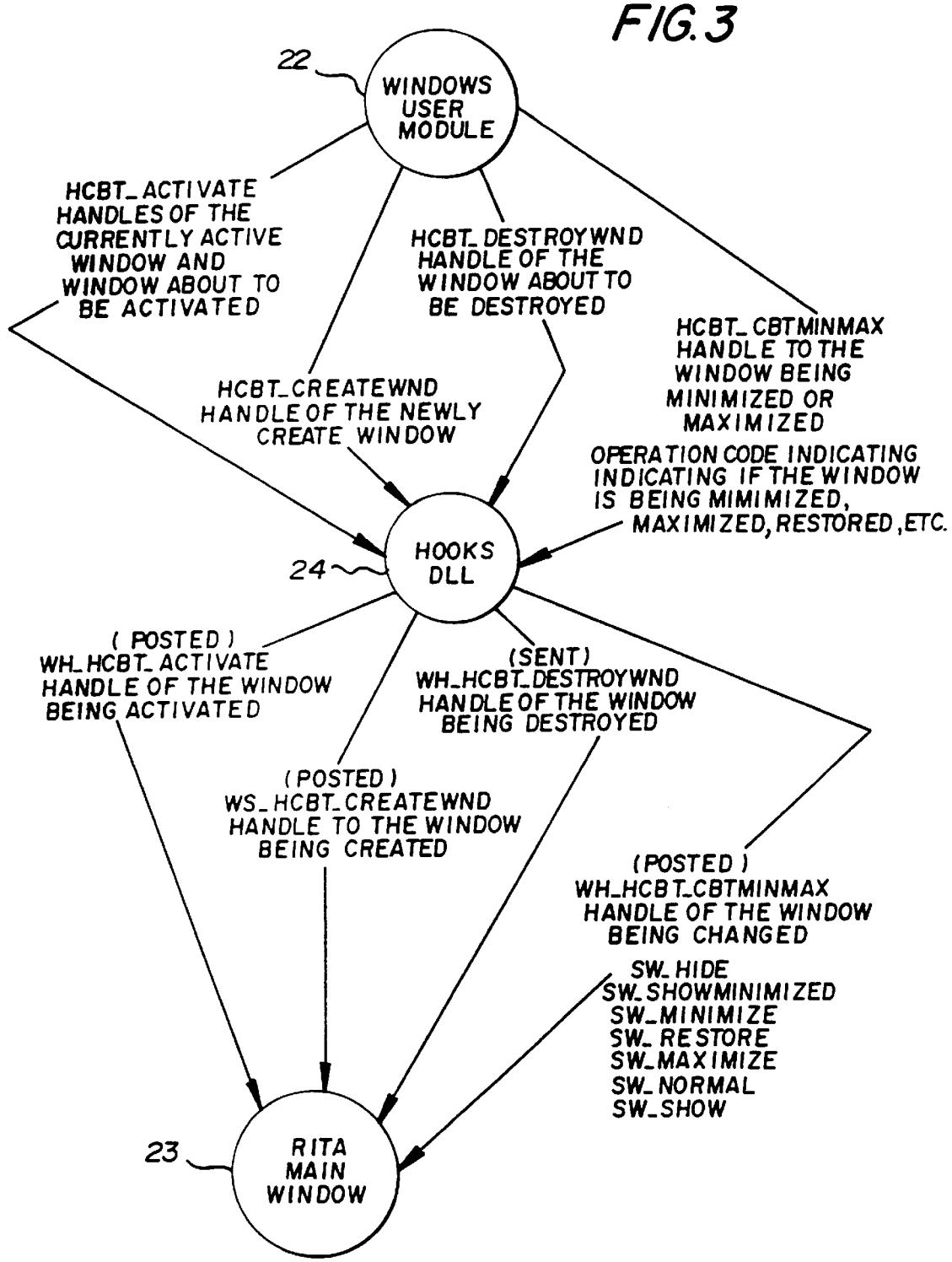
FIG. 3 shows transmission of messages and events.

FIG. 3 illustrates transmission of Windows CBT events and Windows user defined messages. Upon the Windows user module 22 generating an HCBT_ACTIVATE message, such message is recognized and registered by the HOOKS DLL module. The HCBT_ACTIVATE indicates identification of the currently active window and the window about to be activated. Upon receipt of the HCBT_ACTIVATE, the HOOKS DLL module will post a WH_HCBT_ACTIVATE message to indicate the handle for logging by RITA of the window being activated. A handle is an integer, uniquely identifying an active process in Microsoft Windows. Upon interception of an HCBT_CREATEWND message indicating the handle of the newly created window from the Windows user module 22, the HOOKS DLL module 24 will post a WH_HCBT_CREATEWND to RITA for logging. Upon interception of an HCBT_DESTROYWND message from the Windows user module 22 indicating the handle of a window about to be destroyed, the HOOKS DLL module 24 will send a WH_HCBT_DESTROYWND message to the RITA main window 23 for logging. Upon interception of an HCBT_CBT_MINMAX message from the Windows user module indicating the handle of a window about to be minimized or maximized, the HOOKS DLL module 24 will post a WH_HCBT_CBTMINMAX message to the RITA main window 23. The HCBT_CBTMINMAX message may take several forms, each being operation codes which will indicate if the window is being minimized, maximized, restored, etc. Depending on the operation code intercepted, the HOOKS DLL will post one of several messages to RITA for logging, including an SW_HIDE, SW_SHOWMINIMIZED, SW_MINIMIZE, SW_RESTORE, SW_MAXIMIZE, SW_NORMAL or SW_SHOW.

FIG. 4 illustrates the RITA main window 23 response to Windows application messages generated by the window user module. Block 27 illustrates the RITA response to a WM_CREATE message. A WM_CREATE message indicates that the application is starting. The response will be to prompt the panelist ID message (if this is the first time the application is run), to log a METER operation code entry, to log a PANEL operation code entry, to log a START operation code entry, and to log one or more RUNNG tasks entries. The prompt for panelist ID allows the panelist to uniquely identify him/herself with a predetermine seven digit number.

Each event that is logged requires construction of a log entry as described below. Each entry will include an operation code indicative of the type of event being logged. RUNNG tasks entries are logged for any Windows application which is already running when the computer use meter is invoked through the main RITA module. Block 28 indicates the RITA response to a WM_SYSCOMMAND message. A WM_SYSCOMMAND message indicates that the user has activated the HTI icon from the Windows desktop. The response will be to change the user dialogue and to log a PANEL operation code entry. Changing the user dialogue affects the user name stored in subsequent logged records. Block 29 indicates the RITA response to a WM_QUERYENDSESSION message. A WM_QUERYENDSESSION message indicates that Windows is shutting down, but first passing control to RITA so that it may close itself cleanly. The response will be to log a STOPM operation code entry and to flush the log. Block 30 illustrates the RITA response to the WM_DESTROY message generated by the user module. A WM_DESTROY message indicates the user explicitly closed RITA. The response is to log a STOPM operation code entry and to flush the log. The log flush operation constitutes writing to the log file any records that are still held in memory.

The log file may use a fixed column format to store data. The first column may contain a logging sequence number that may be used for post processor parsing. The log file may also include columns for a date stamp and a time stamp to be applied to each record. The next column may include an operation code as follows:

| | |
|---|---|
| RUNNG | This designates the tasks that are already running |
| PANEL | Panelist name and identification are located in record data portion |
| METER | application log and version information |
| START | Starts the meter |
| ACTVT | Notes that a top level window task is activated |
| TSTRT | Notes that a top level window task has started |
| TSTOP | Notes a top level window task has stopped |
| MINIM | Notes that a top level window has been minimized |
| RESTO | Notes that a top level window has either been restored from its ionic states or restored to its original state from a maximized state |
| STOPM | stops the meter |
| INTRV | Interview record data |

The following represents an example of log entries.

| | | | | | |
|---|---|---|---|---|---|
| 00001 | 05/25/95 | 10:40:27 | METER | 1234561 0000 | [D=2.00-02] |
| 00002 | 05/25/95 | 10:40:27 | PANEL | 1234561 0000 | [D=John Doe] |
| 00003 | 05/25/95 | 10:40:27 | START | 1234561 0000 | [D=ini StartTask=1 EndTask=1 Minimize=2 Maximize=1 Activate=1 Restore=1 Running=1] |
| 00004 | 05/25/95 | 10:40:27 | RUNNG | 1234561 2a96 | [D=C:\DOS\MOUSE\POINTSR.EXS] [T=Pointer Options] [S=10432] |
| 00005 | 05/25/95 | 10:40:27 | RUNNG | 1234561 201e | [D=C:\WINDOWS\NETDDE.EXS] [T=NetDDE] [S=§2432] |
| 00006 | 05/25/95 | 10:40:27 | RUNNG | 1234561 1f6e | [D=C:\WINDOWS\SYSTEM\DDEML.DLL] [S=39424] |
| 00007 | 05/25/95 | 10:40:27 | RUNNG | 1234561 0736 | [D=C:\WINDOWS\SYSTEM\USER.EXE] [S=264096] |
| 00009 | 05/25/95 | 10:40:27 | RUNNG | 1234561 37de | [D=C:\HTI\HTI\.EXE] [T=HTI] [S=55656] |

-continued

| | | | | | | |
|---|---|---|---|---|---|---|
| 000010 | 05/25/95 | 10:40:27 | MINIM | 1234561 | 37de | [D=C:\HTI\HTI.EXE] |
| 000011 | 05/25/95 | 10:40:28 | ACTVT | 1234561 | 164e | [D=C:\APPWIN\DASH\DASH.EXE] |
| 000014 | 05/25/95 | 10:40:29 | TSTRT | 1234561 | 357e | [D=C:\APPWIN\OMGUI\OMGUI.EXE] [T=OpenMail user 'pinsley' on server 'nyl'] [S=443360] |
| 000015 | 05/25/95 | 10:40:33 | TSTRT | 1234561 | 36d6 | [D=C:\WINDOWS/UALALLOC.EXE] [S=3776] |
| 000016 | 05/25/95 | 10:40:33 | TSTRT | 1234561 | 08ce | [D=C:\WINDOWS\SYSTEM\HSASRV.EXE] [T=Windows Sockets Asynchronous Request Server] [S=6505] |
| 000017 | 05/25/95 | 10:40:34 | TSTOP | 1234561 | 357e | [D=C:\APPWIN\OMGUI\OMGUI.EXE] |
| 000018 | 05/25/95 | 10:40:34 | TSTRT | 1234561 | 357e | [D=C:\APPWIN\OMGUI\OMGUI.EXE] |
| 000019 | 05/25/95 | 10:40:34 | ACTVT | 1234561 | 164e | [D=C:\APPWIN\DASH\DASH.EXE] |
| 000022 | 05/25/95 | 10:40:36 | ACTVT | 1234561 | 164e | [D=C:\APPWIN\DASH\DASH.EXE] |
| 000024 | 05/25/95 | 10:40:36 | TSTOP | 1234561 | 1f6e | [D=C:\WINDOWS\SYSTEM\DDEML.DLL] |
| 000025 | 05/25/95 | 10:40:36 | TSTOP | 1234561 | 1f6e | [D=C:\WINDOWS\SYSTEM\DDEML.DLL] |
| 000026 | 05/25/95 | 10:40:40 | ACTVT | 1234561 | 164e | [D=C:\APPWIN\DASH\DASH.EXE] |
| 000027 | 05/25/95 | 10:40:40 | TSTRT | 1234561 | 2fe6 | [D=C:\WINDOWS\CALC.EXE] [T=Calculator] [S=43072] |
| 000028 | 05/25/95 | 10:40:41 | ACTVT | 1234561 | 164e | [D=C:\APPWIN\DASH\DASH.EXE] |
| 000029 | 05/25/95 | 10:40:43 | ACTVT | 1234561 | 164e | [D=C:\APPWIN\DASH\DASH.EXE] |
| 000030 | 05/25/95 | 10:40:43 | TSTRT | 1234561 | 3016 | [D=C:\WINDOWS\CARDFILE.EXE] [T=Cardfile - (Untitled)] [S=93184] |
| 000031 | 05/25/95 | 10:40:44 | ACTVT | 1234561 | 164e | [D=C:\APPWIN\DASH\DASH.EXE] |
| 000032 | 05/25/95 | 10:40:46 | ACTVT | 1234561 | 164e | [D=C:\APPWIN\DASH\DASH.EXE] |
| 000033 | 05/25/95 | 10:40:46 | TSTRT | 1234561 | 2b16 | [D=C:\WINDOWS\NOTEPAD.EXE] [T=Notepad - (Untitled)] [S=32736] |
| 000034 | 05/25/95 | 10:40:46 | ACTVT | 1234561 | 2b16 | [D=C:\WINDOWS\NOTEPAD.EXE] |
| 000035 | 05/25/95 | 10:40:51 | ACTVT | 1234561 | 3016 | [D=C:\WINDOWS\CARDFILE.EXE] |
| 000036 | 05/25/95 | 10:40:57 | ACTVT | 1234561 | 2fe6 | [D=C:\WINDOWS/CALC.EXE] |
| 000037 | 05/25/95 | 10:40:58 | MINIM | 1234561 | 3016 | [D=C:\WINDOWS\CARDFILE.EXE] |
| 000038 | 05/25/95 | 10:40:58 | ACTVT | 1234561 | 3016 | [D=C:\WINDOWS\CARDFILE.EXE] |
| 000039 | 05/25/95 | 10:41:00 | ACTVT | 1234561 | 2b16 | [D=C:\WINDOWS\NOTEPAD.EXE] |
| 000040 | 05/25/95 | 10:41:02 | TSTOP | 1234561 | 2b16 | [D=C:\WINDOWS\NOTEPAD.EXE] |
| 000041 | 05/25/95 | 10:41:02 | ACTVT | 1234561 | 3016 | [D=C:\WINDOWS\CARDFILE.EXE] |
| 000042 | 05/25/95 | 10:41:04 | ACTVT | 1234561 | 2fe6 | [D=C:\WINDOWS/CALC.EXE] |
| 000043 | 05/25/95 | 10:41:05 | RESTO | 1234561 | 2fe6 | [D=C:\WINDOWS/CALC.EXE] |
| 000044 | 05/25/95 | 10:41:06 | TSTOP | 1234561 | 2f36 | [D=C:\WINDOWS/CALC.EXE] |
| 000045 | 05/25/95 | 10:41:06 | ACTVT | 1234561 | 3016 | [D=C:\WINDOWS\CARDFILE.EXE] |
| 000046 | 05/25/95 | 10:41:08 | TSTOP | 1234561 | 3016 | [D=C:\WINDOWS\CARDFILE.EXE] |
| 000047 | 05/25/95 | 10:41:08 | ACTVT | 1234561 | 164e | [D=C:\APPWIN\DASH\DASH.EXE] |
| 000048 | 05/25/95 | 10:41:16 | ACTVT | 1234561 | 164e | [D=C:\APPWIN\DASH\DASH.EXE] |
| 000049 | 05/25/95 | 10:41:19 | STOPM | 1234561 | 0000 | [D=Windows Shutdown] |

As can be seen from the log entry table, each entry includes a sequence number, date stamp, time stamp, operation code or event type, and data field. The information contained in the data field is dictated by the event type. In the example shown, the next field contains the panelist or user identification, in this case "1234561" followed by a field containing the handle to the instance of the application, if any. Log record sequence number 00001 has a METER operation code entry which records the application, logo and version information in the data field. In the log entry having sequence number 00002, the PANEL operation code is presented to store the panelist's name and may store other identification information. In the example given, the name recorded is John Doe. Upon application start-up, a START operation code log entry is made which records configuration information in the data field. According to an advantageous embodiment, the computer use meter is automatically minimized after start-up. Other relevant information may be included in the data portion of log entries for various event types. The data field may include different information identified by label. In the example shown the label "S" identifies the file size of an application. The label "T" identifies the Windows title of the application. The label "D" identifies miscellaneous data, typically the full path of the application. Other labels and information could also be logged.

According to a further embodiment of the invention, the use meter may log additional events either in the same log file or in auxiliary logged files. The additional events may be logged based on a periodic audit. The periodic audit may be triggered by a timer. That timer is advantageously implemented in software and may run in its own window or on a systems level. Advantageously, an audit is triggered every one-half second, although other trigger periods may be selected. The use meter may periodically audit computer use for on-line program activity. The meter may be set to audit the computer for predetermined or preselected computer applications or applications which rely on predetermined resources such as modem access. The preselected computer applications may be known online service access and interface applications such as those provided by America Online, Compuserve, Prodigy or the Microsoft Network. If the audit reveals that one of the preselected applications is displayed or, alternatively, active, information from the application window and the top window may be logged. Advantageously, the logged information may be the textual content of the application's title bar and that of the top window of such an application. According to a preferred refinement, the system will only log the textual content of the title bars if the contents of the application or top window title bars are different from the previously logged title bars for the same application.

Another embodiment of the periodic auditing feature includes periodically auditing preselected types of display elements. In the Windows operating system, each displayed window is made up of a number of display elements. The display elements include inter alia edit boxes and buttons. According to a preferred feature, the content of edit boxes may be examined. If the content is consistent with a predetermined criteria, the content will be logged. For example, it is assumed that, if the content of an edit box is consistent with the syntax for a URL, then the window corresponds to an internet browser program. Logging the content of the edit box will be indicative of the user's access of documents on the internet.

FIG. 5 shows an audit based use meter. The audit based subsystem includes a timer 40. The timer 40 triggers the audit module 41. The audit module compares the content of an audit target 42 against predetermined criteria 43. If the predetermined criteria are satisfied, the audit module creates an entry in the event log 44. The target may be a display or other information indicative of computer use and activity. The criteria 43 maybe an identification of predetermined application programs, Windows, or a syntax such as, for example, a syntax consistent with a univeral resource locator for the Internet or, more particularly, for the Worldwide Web.

It will be understood by those of ordinary skill in the art that the use meter, according to the invention, may be altered in various ways within the basic concept of the invention.

What is claimed is:

1. A monitoring system, comprising:
    a plurality of local computer use meters installed in user computer machines, each user meter including a log of predetermined events stored in an associated user computer machine, wherein said log of predetermined events identifies character strings reflecting on-line activity;
    a central processing station which receives and stores said log of predetermined events from said plurality of computer use meters;
    a database management system for accessing, processing and generating reports based on the stored predetermined events; and
    wherein said processing station is linked to said plurality of computer use meters.

2. The monitoring system of claim 1, wherein said character swings represents a URL address on the world wide web.

3. The monitoring system of claim 2, wherein said each user meter logs at least date and time information with each predetermined events stored in said associated user computer machine to provide web traffic statistical information.

4. The monitoring system of claim 1, wherein said central processing station receives said log of predetermined events over an electronic communication channel.

5. The monitoring system of claim 1, wherein said each user meter logs applications running on said associated user computer machine.

6. The monitoring system of claim 5, wherein said each user meter logs the launching and termination of application on said associated user computer machine.

7. The monitoring system of claim 6, wherein said each user meter logs the switching resources from one application to another, the minimizing an application and the restoring an application on said associated user computer machine.

8. The monitoring system of claim 1, wherein said each user meter includes a timer to periodically audit information displayed on said associated user computer machine.

9. The monitoring system of claim 1, wherein said each user meter includes a timer to periodically audit information requested by said associated user computer machine.

10. The monitoring system of claim 1, wherein said each user meter compresses said log of predetermined events and stores said compressed log of predetermined events in said associated user machine.

11. The monitoring system of claim 1, wherein said each user meter encrypts said log of predetermined events and wherein said central processing station receives said encrypted log of predetermined events from said plurality of computer use meters.

12. A monitoring method, comprising the steps of:
    logging predetermined events by a plurality of local computer use meters installed in user computer machines, wherein said log of predetermined events identifies character strings reflecting on-line activity;
    storing said log of predetermined events by each use meter in an associated user computer machine;

receiving and storing said log of predetermined events by a central processing station from said plurality of computer use meters;

accessing, processing and generating reports based on the stored predetermined events by a database management system; and wherein said processing station is linked to said plurality of computer use meters.

13. The monitoring method of claim 12, wherein said character stings represents a URL address on the world wide web.

14. The monitoring method of claim 13, wherein the step of logging logs at least date and time information with each predetermined events stored in said associated user computer machine to provide web traffic statistical information.

15. The monitoring method of claim 12, wherein the step of receiving and storing receives said log of predetermined events over an electronic communication channel.

16. The monitoring method of claim 12, wherein the step of logging logs applications running on said associated user computer machine.

17. The monitoring method of claim 16, wherein the step of logging logs the launching and termination of application on said associated user computer machine.

18. The monitoring method of claim 17, wherein the step of logging logs the switching resources from one application to another, the minimizing an application and the restoring an application on said associated user computer machine.

19. The monitoring method of claim 12, fixer comprising the step of periodically auditing information displayed on said associated user computer machine.

20. The monitoring method of claim 12, further comprising the step of periodically auditing information requested by said associated user computer machine.

21. The monitoring method of claim 12, wherein the step of logging includes the step of compressing said log of predetermined events; and wherein the step of storing stores said compressed log of predetermined events in said associated user machine.

22. The monitoring method of claim 12, wherein the step of logging includes the step of encrypting said log of predetermined events.

23. The monitoring method of claim 12, further comprising the step of eavesdropping on operating system messages and indicating the receipt of predetermined types of messages responsive to an operating system module.

* * * * *